P. W., J. W. & W. SOMMER.
WIRE FENCE MACHINE.
APPLICATION FILED SEPT. 11, 1903.
999,411.
Patented Aug. 1, 1911.
9 SHEETS—SHEET 4.
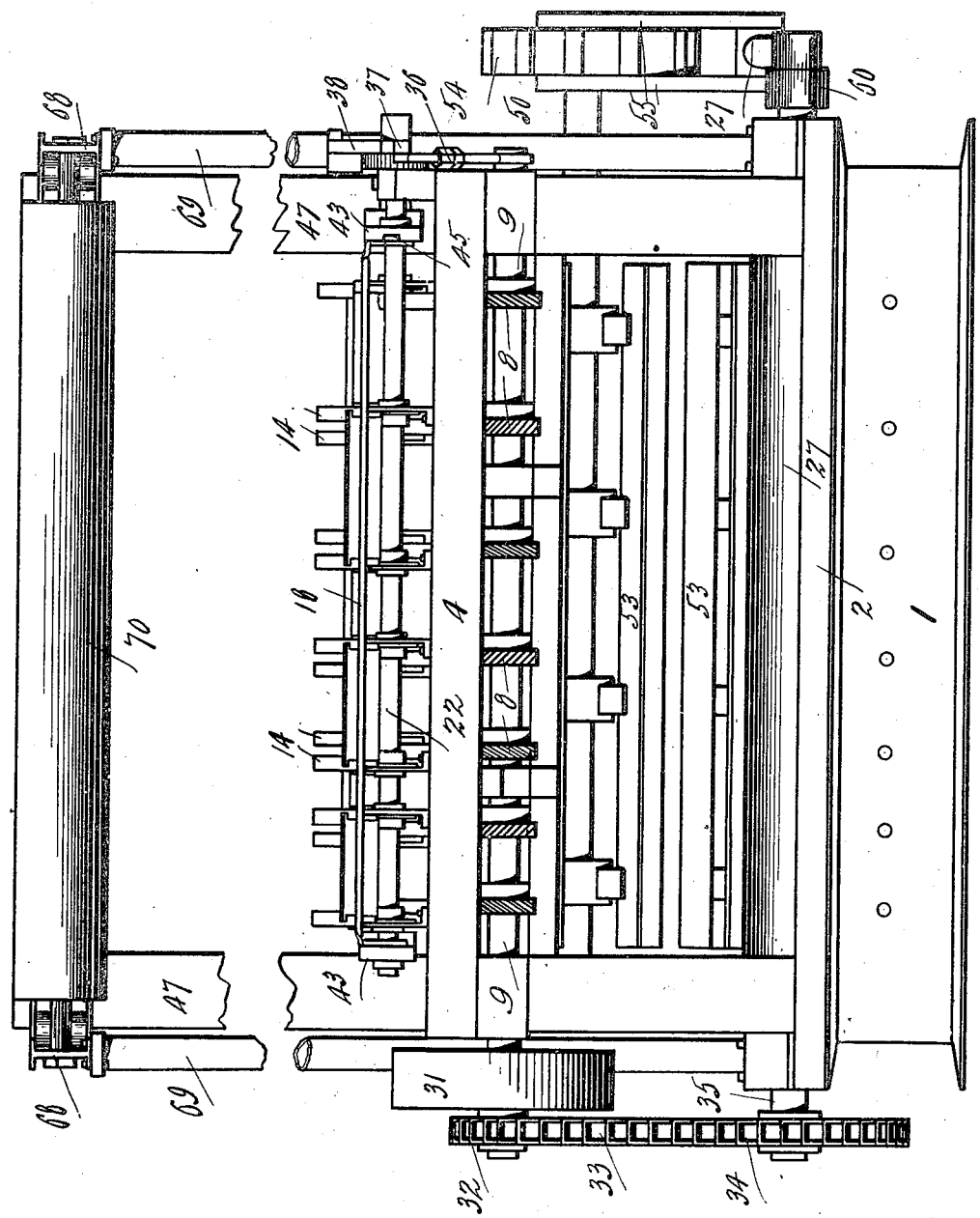
WITNESSES:
INVENTORS
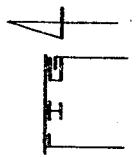

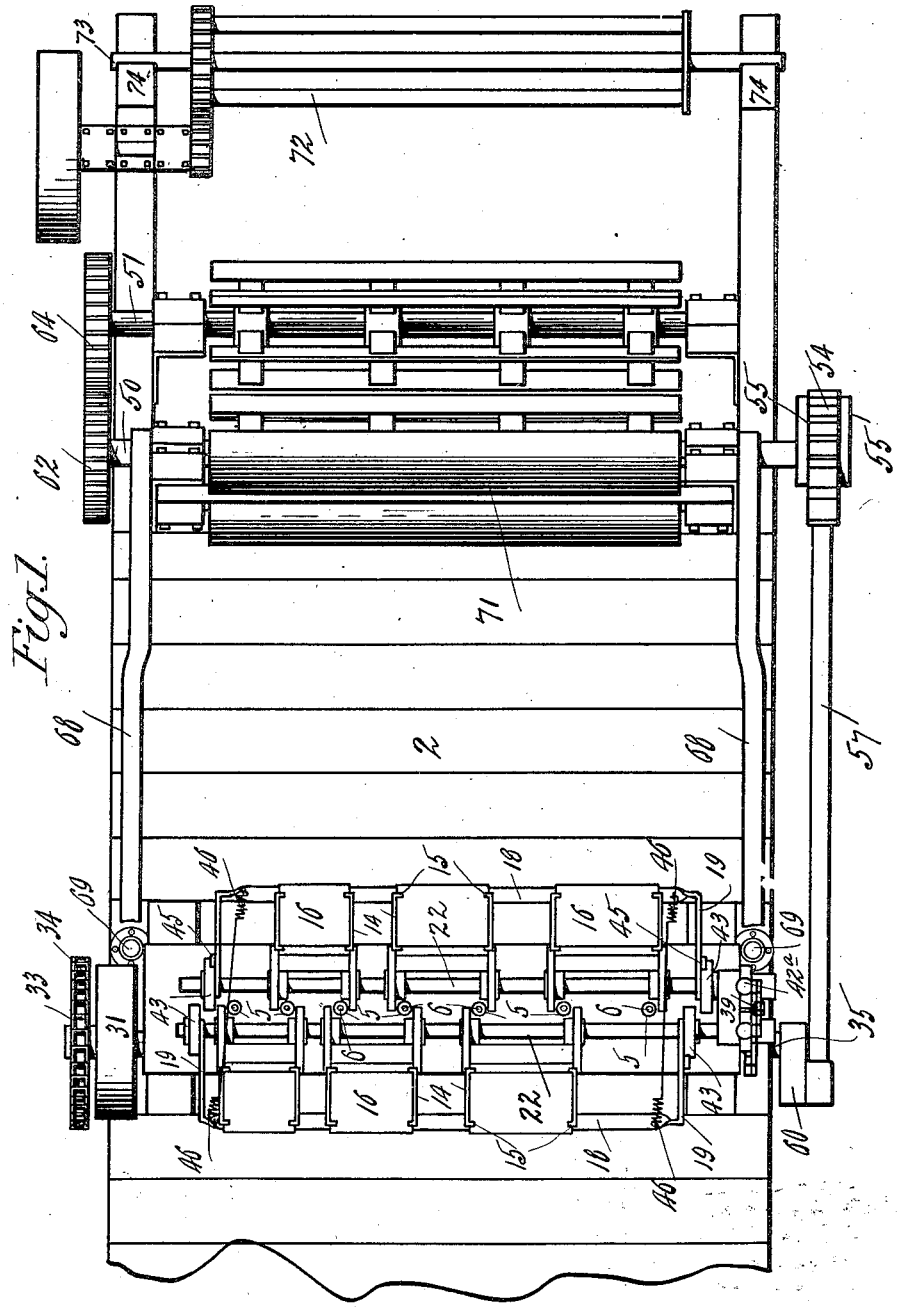

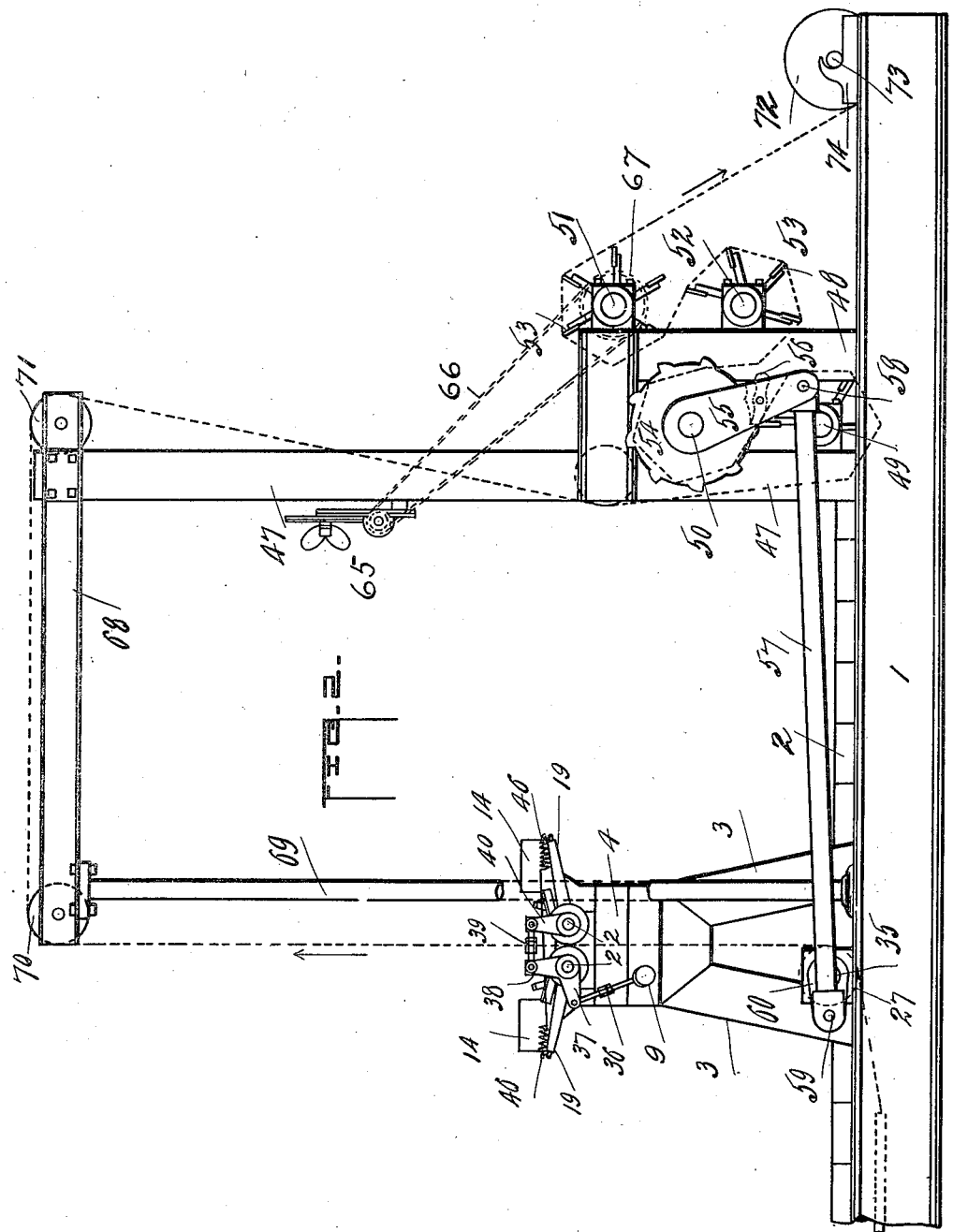

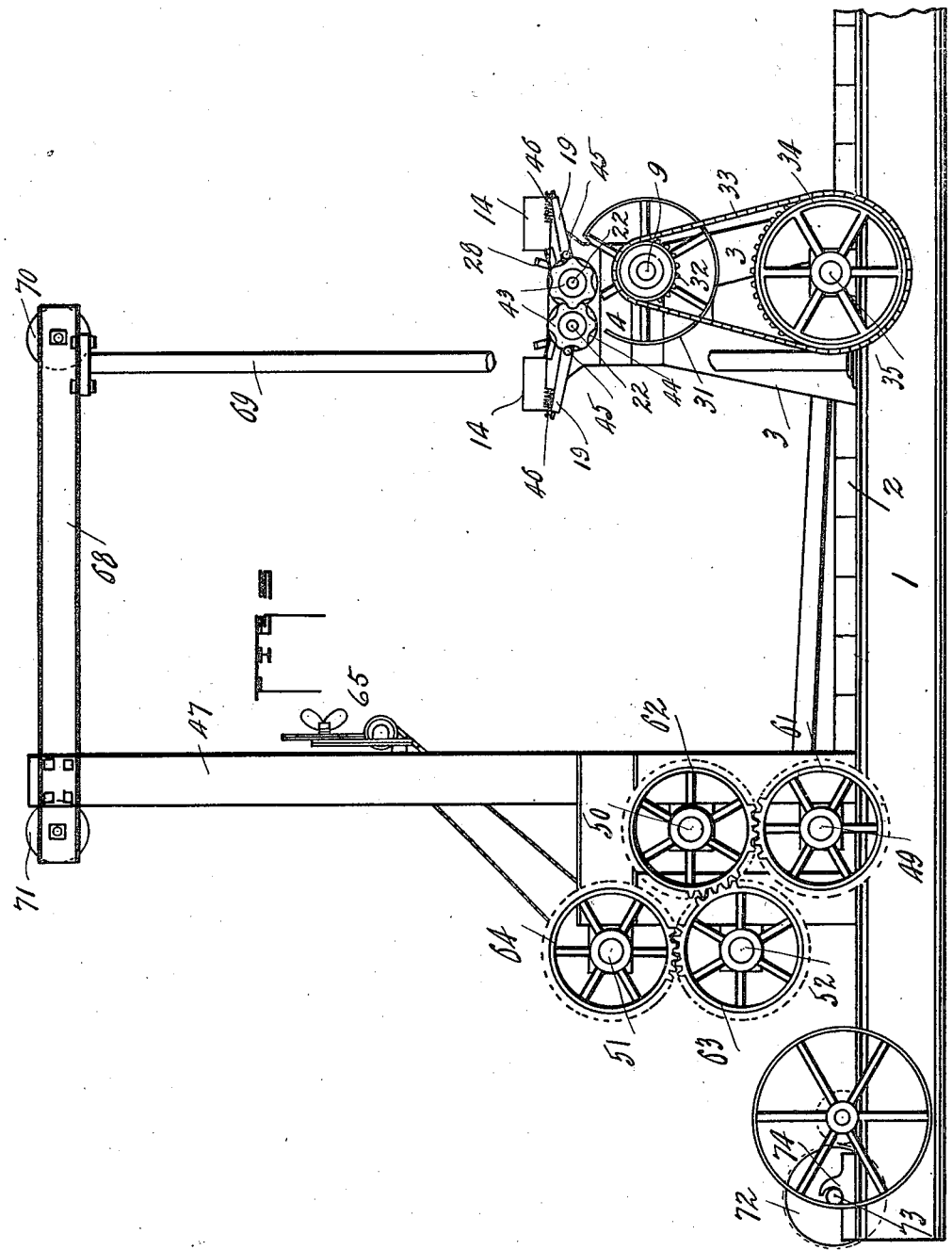

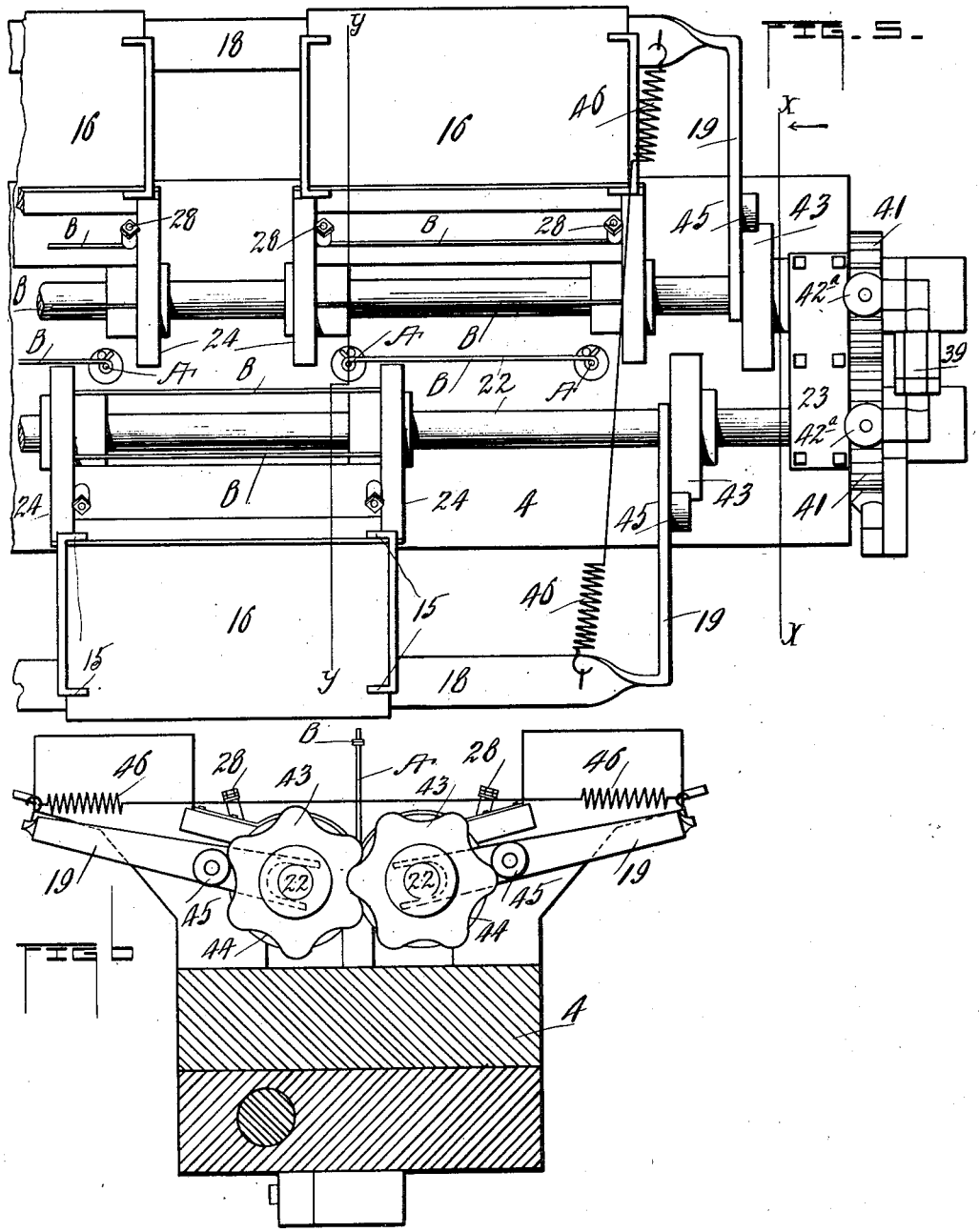

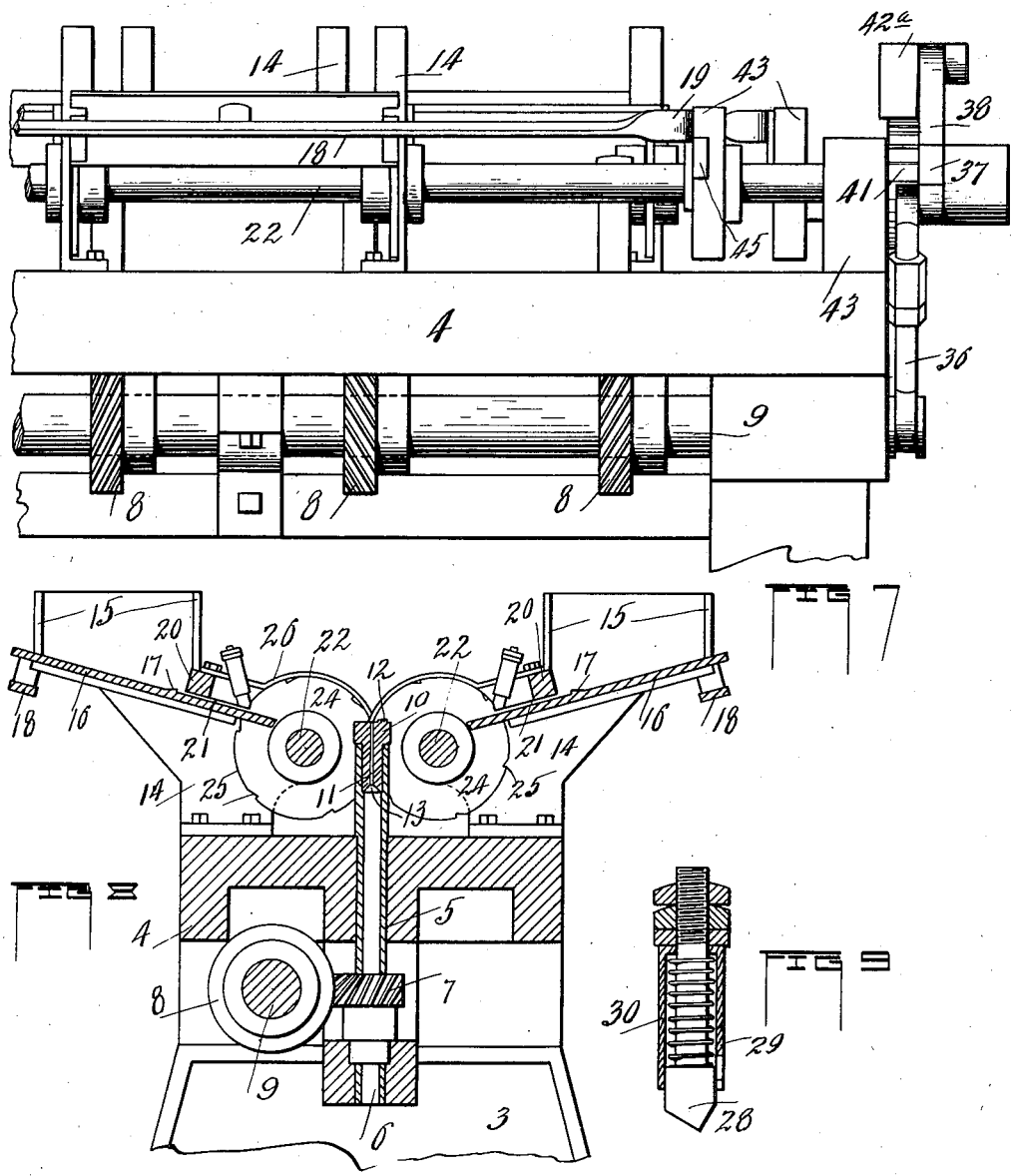

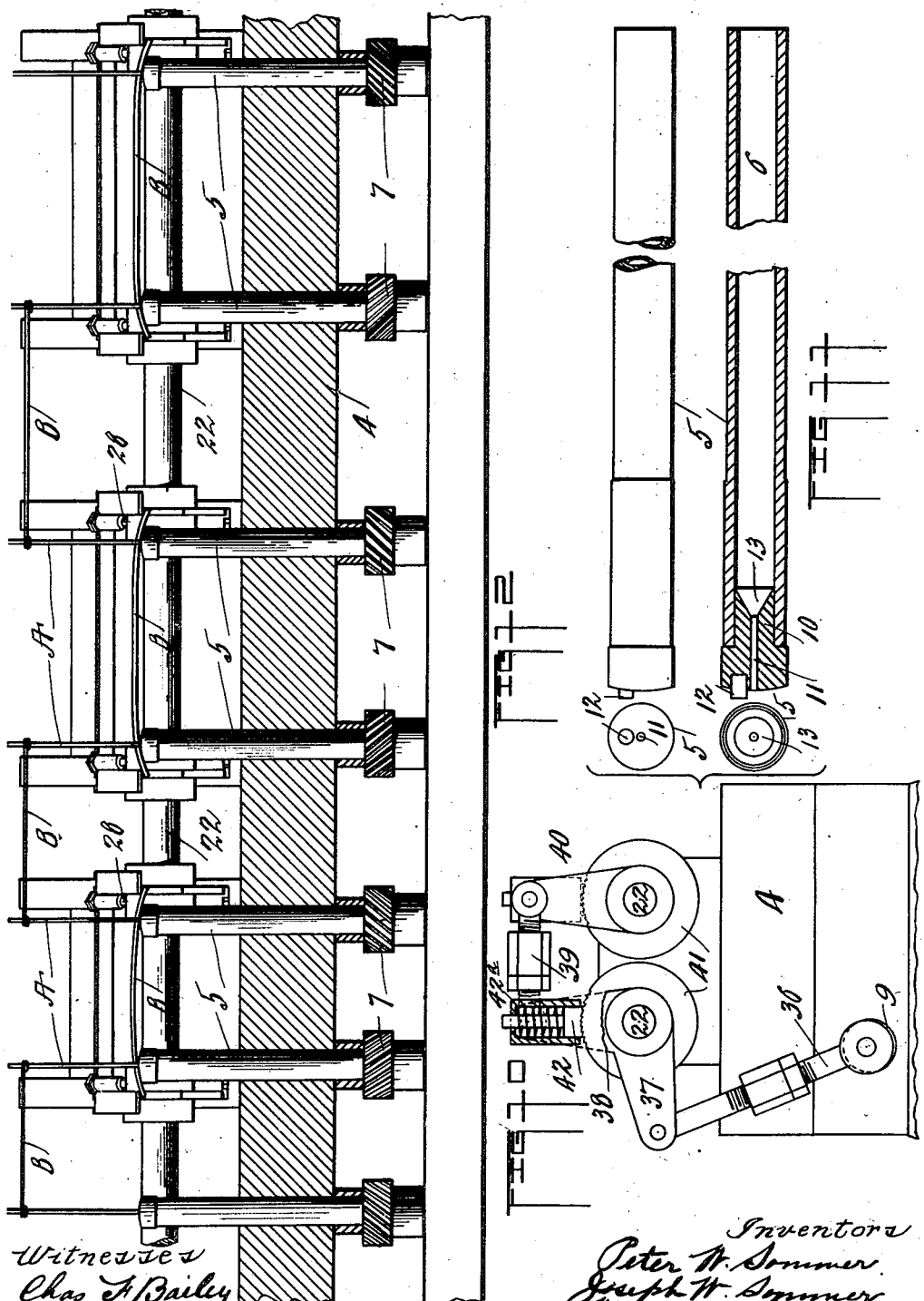

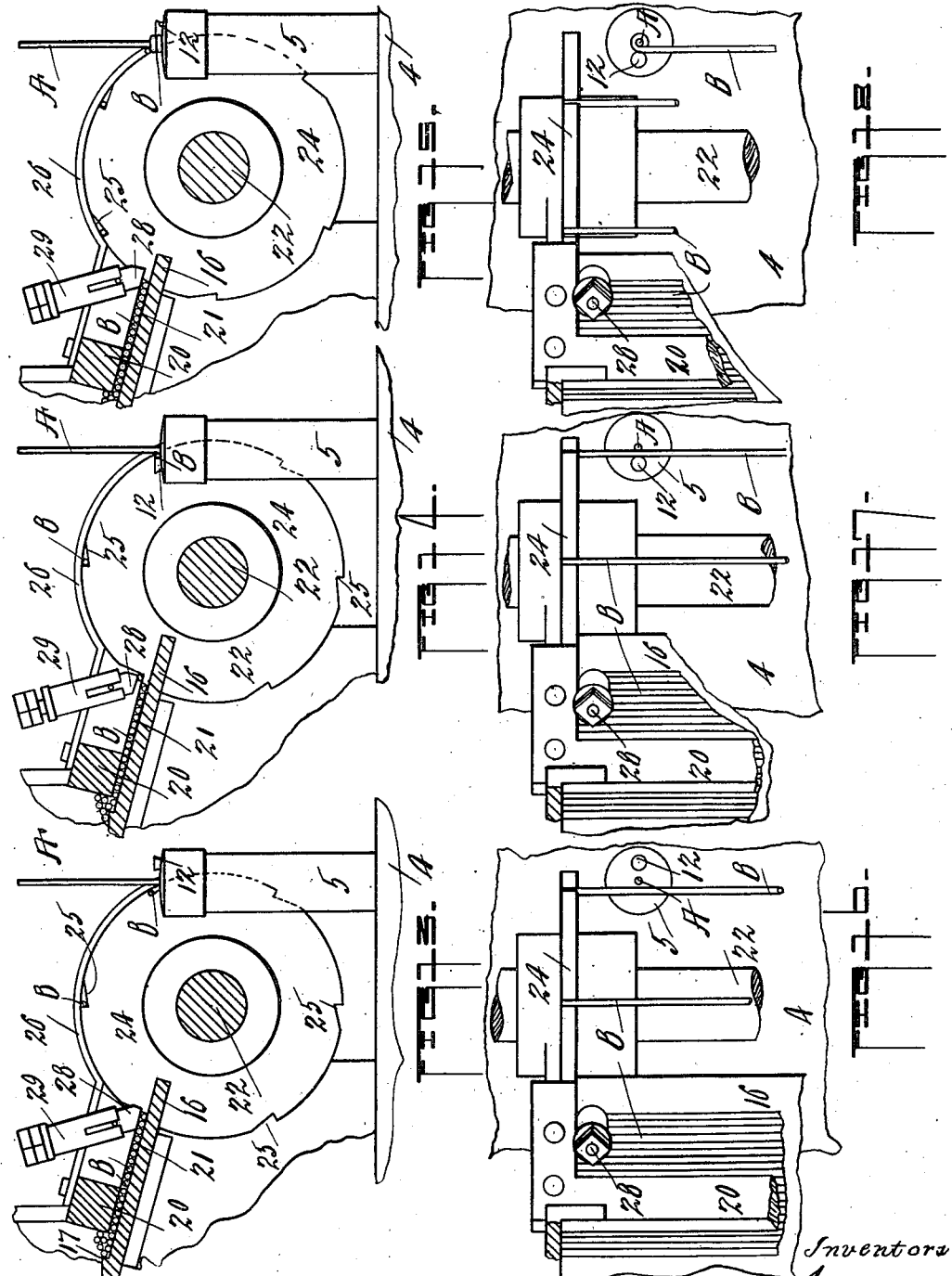

P. W., J. W. & W. SOMMER.
WIRE FENCE MACHINE.
APPLICATION FILED SEPT. 11, 1903.
999,411.
Patented Aug. 1, 1911.
9 SHEETS—SHEET 9.
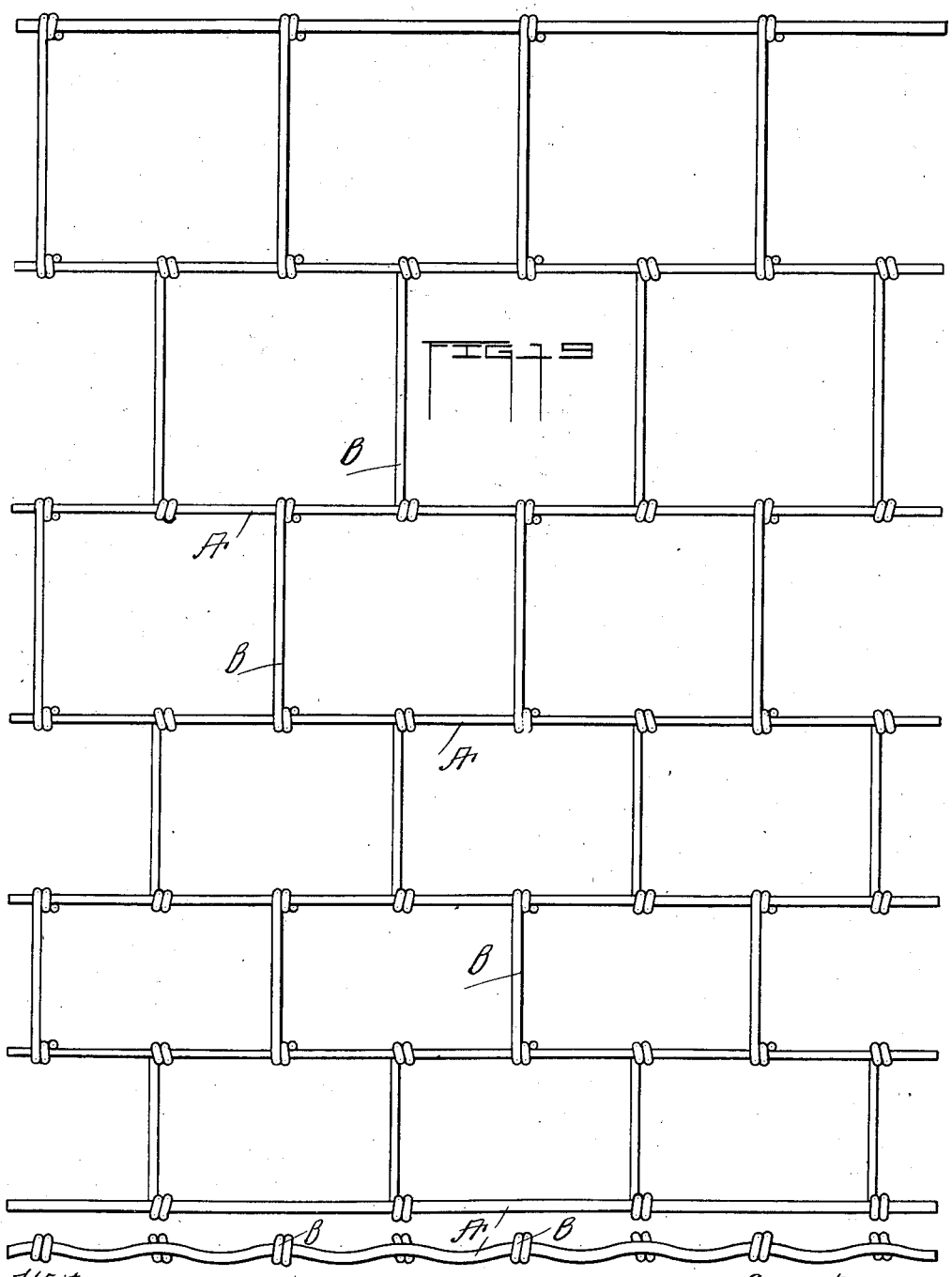

UNITED STATES PATENT OFFICE.

PETER W. SOMMER, JOSEPH W. SOMMER, AND WILLIAM SOMMER, OF PEORIA, ILLINOIS, ASSIGNORS, BY DIRECT AND MESNE ASSIGNMENTS, TO KEYSTONE STEEL AND WIRE COMPANY, OF SOUTH BARTONVILLE, ILLINOIS, A CORPORATION OF ILLINOIS.

WIRE-FENCE MACHINE.

999,411.      Specification of Letters Patent.      Patented Aug. 1, 1911.

Application filed September 11, 1903. Serial No. 172,744.

*To all whom it may concern:*

Be it known that we, PETER W. SOMMER, JOSEPH W. SOMMER, and WILLIAM SOMMER, citizens of the United States, residing at Peoria, in the county of Peoria and State of Illinois, have invented certain new and useful Improvements in Wire-Fence Machines; and we do hereby declare that the following is a full, clear, and exact description of the invention, which will enable others skilled in the art to which it appertains to make and use the same.

This invention has reference to wire-fence machines, and relates to machines of the class for manufacturing what is known as "square-mesh" fencing, being that type of fence which consists of longitudinal strand or running wires tied together by a plurality of transverse stays or picket-wires. In this particular instance the machine is adjusted or arranged to make "staggered-stay" fencing, where the line wires are tied together in pairs by transverse stays or picket-wires that are wound at their ends about two of the longitudinal strands, and where the stays are arranged in break-joint fashion.

One of the objects of the present invention is to simplify the structure of machines in this class, by feeding the longitudinal strand or line wires approximately continuously but rapidly intermittently and connecting therewith in a suitable manner sections of stays or picket-wires which are previously cut into proper lengths and fed sidewise by suitable movable feeders or picket-wire-magazines which receive the stays or picket-wires from suitable receptacles, hoppers or magazines and deposit the same in a position to be engaged by coiling or winding devices, whereby their opposite ends may be wrapped or coiled around adjacent longitudinal strand or line wires.

A further object of the invention is to secure the feeding of the longitudinal strand or line wires through coilers or winders, preferably disposed between two rows of stay or picket-wire feeding devices; said stay or picket-wire feeding devices comprising hoppers, receptacles or stay or picket-wire containing magazines, each formed with reciprocating slides, and revoluble carriers, feeders, transfer members or stay or picket-wire magazines, having picket-wire-receiving grooves, for depositing the stays or picket-wires into position to have their ends coiled around adjacent longitudinal strand or line wires.

A further object of the invention is mechanism for intermittently and successively feeding or advancing the stay or picket-wires to the line wires.

Further objects and aims of the invention will be further understood from the following specification together with the accompanying drawings forming a part thereof, in which:—

Figure 1 is a plan view on a greatly reduced scale of our improved machine; Fig. 2 is a side elevation of the same from one side; Fig. 3 is a side elevation of the same from the opposite side; Fig. 4 is a front elevation of the machine somewhat enlarged, and with parts broken away; Fig. 5 is a plan view, enlarged, of the bed-plate carrying the coilers or winders, stay or picket-containing magazines or hoppers, and the mechanism coacting with such parts, see Fig. 1; Fig. 6 is a vertical cross-section on the line X—X, Fig. 5; Fig. 7 is a front elevation of parts seen in Fig. 5; Fig. 8 is a vertical cross-section on the line Y—Y of Fig. 5; Fig. 9 is an enlarged vertical longitudinal section of a plunger forming one of the details of the machine; Fig. 10 is an enlarged elevation in outline and section of the mechanism for imparting reciprocal movement to the sliding sections of the picket-containing magazines or hoppers, and for intermittently feeding the stay-sections or pickets; Fig. 11 shows enlarged, in elevation and longitudinal section, also an end view and in cross-section, the coiling or winding devices; Fig. 12 is an enlarged vertical longitudinal section through the bed-plate, showing the relative arrangement of the coilers or winders and stay or picket-feeding devices; Figs. 13, 14 and 15 show enlarged sectional views, of the stay or picket-feeding devices and coilers or winders during the feeding of the stay or picket wires to the longitudinal or line wires; Figs. 16, 17 and 18 show in plan the devices seen in Figs. 13, 14 and 15; Fig. 19 illustrates in elevation the fabric made by our machine; Fig. 20 illustrates in plan an edge view of the fabric seen in Fig. 19.

Referring to the several views of the machine, 1 indicates a ground base, a portion of which is covered with flooring 2 on which an operator may stand. At the forward end of the base are arranged the standards 3 supporting a bed-plate 4 which is disposed transversely of the base 1.

Journaled in the bed-plate and protruding up through the same a suitable distance is provided a series of coilers or winders 5 having the longitudinal openings 6. On the lower end of the coilers or winders is secured a spiral-gear 7 each of which intermeshes with a spiral-gear 8 on a longitudinal shaft 9 journaled in suitable bearings secured beneath the bed-plate. The coilers or winders are preferably disposed vertically and at graduated distances apart, for the purpose of producing a fence fabric having a graduated mesh from top to bottom; but it is understood that the coilers or winders may be arranged at uniform distances and operated with as good results. Each alternate coiler or winder rotates in an opposite direction, and to accomplish such rotation alternate gears 7 are rights and lefts, and are so arranged that the sections of a stay or picket wire spanning the alternate spaces between the strands in a line are fed simultaneously and alternately, which brings the ends of adjacent stay or picket wires, although extending laterally in opposite directions, to be actuated successively by the same coilers or winders and directs all such coils around the same strand or line wires in the same direction which may be over or under. In the upper end of each coiler or winder is carried a plug 10 having a central longitudinal wire opening 11; and 12 indicates a coiling pin attached to or forming a part of the plug 10 disposed adjacent to the wire opening 11 therein. The inner end of the plug is provided with a beveled opening 13 leading to the opening 11, to facilitate in preliminarily passing a wire through the coilers 5 and through the wire opening 11 in the plug 10 and securing the ends of the wires to take-up and wrapping devices to be described.

Supported on the bed-plate upon opposite sides of the coilers or winders 5 is a series of receptacles, hoppers or stay or picket-wire containing magazines, formed of the side supports 14 having the inturned front and rear lips 15 forming sectional front and rear walls. The hoppers, receptacles or stay or picket-wire containing magazines, are each provided with the inclined reciprocal slides or bottoms 16 extending forward and rearwardly of said hoppers, receptacles or magazines, and within the receptacles and extending transversely, the slides are each provided with short extensions, ribs, or ridges 17 for a purpose to be described. The outside portions of the slides or bottoms 16 are attached to the frames 18, and the frames 18 at their extreme outer ends have the right-angular extensions 19 engaged by means for reciprocating the slides 16.

20 denotes a covering plate suitably arranged above the bottom 16 so as to form a channel 21 for guiding the stays or picket wires to rotary-carriers, movable-transfer-members, or rotating picket-wire-magazines, which receive and deliver the stay-sections or picket-wires, to the coilers or winders.

The sides 14 of the hoppers, receptacles or picket-wire containing magazines, form bearings through which extend a pair of shafts 22 disposed parallel to each other, which are also journaled in the double-boxing 23. On the shafts 22 are carried a plurality of disks or equivalent revoluble carriers or feeders 24, which are nothing more than movable-transfer-members or picket-wire magazines, provided with notches or picket-wire-receiving grooves 25 at intervals in their peripheries. The disks, feeders or transfer members 24 are so disposed on the shafts 22 that there are two in front of each hopper, receptacle or picket-wire container, one at each end thereof; and 26 are covering plates or guards for a portion of such feeders or transfer members. Each pair of disks, feeders or transfer members 24 has all the functions of a revoluble picket-wire magazine, as each of said feeders has wire-receiving grooves into which are deposited or which receive the stay-sections or picket-wires and transfer them to the coilers or winders. Said feeders also support a plurality of such stay-sections or picket-wires while in transit from receiving to delivering position, and thereby may be referred to as revoluble picket-wire-magazines, the same as though such magazines were a solid body carried on shafts 22 instead of spaced feeders, with the intermediate body portions omitted.

For a better understanding of the machine: The coilers or winders 5 are preferably arranged in a row extending longitudinally and centrally of the bed-plate 4 with their upper portions protruding through the bed-plate. The hoppers, receptacles or stay or picket-wire containing magazines, are preferably alternately disposed upon opposite sides of the coilers or winders, with the coilers or winders adjacent the inner faces of the feeders or movable-transfer-members 24, and the disposition of the hoppers, receptacles or stay or picket-wire-containing magazines is such, that from such receptacles on one side of the coilers or winders are fed sidewise stay-sections or picket-wires, preferably in break-joint fashion, adapted to be coiled around the first and second strand wires, the third and fourth strand wires, etc.; while from the hoppers or receptacles on the other side are fed short-stay-sections or picket-wires in break-joint fashion adapted to be coiled or wrapped around the second and third strand-wires, the fourth and fifth strand wires, etc. The stay or picket feeding devices of the hoppers, receptacles or magazines, constituting a row upon opposite sides of the coilers or winders, are timed in their movements to feed alternately the stay-sections or pickets, which in a completed fabric presents a "staggered-stay-fence."

Through the coilers or winders are fed the strand or line wires designated as A, direct from suitable reels (not shown) to and around a roller 27 and to the coilers or winders; and in each of the hoppers, receptacles or stay or picket-wire-containing magazines, are placed a series of stay or picket-sections B, which are slightly longer than the distance between the centers of the coilers or winders. The stay or picket-sections will find their way into the channel 21 and through the reciprocation of the slides or bottom 16 and their edges 17, the said stay or picket-sections will be intermittently and successively deposited into the notches or picket-wire-receiving grooves 25 of the magazine feeders or transfer members 24 which will advance or carry the said stay or picket-sections to a position where the coiling pins 12 of the coilers or winders will coil or wrap the ends of the stay or picket-sections around adjacent strand or line wires. (See Figs. 13, 14, and 15.)

To facilitate in the delivery of the stay or picket-sections to the feeders or transfer members 24 we have provided the yielding plungers 28 carried within the sleeves 29 which are suitably supported within the hoppers or receptacles and disposed so that the plunger will act on the stay or picket-sections at a point where the stay or picket-sections are gathered up by the notches or picket wire receiving grooves 25 in the feeders or transfer members. Thus it will be seen, that as the notches or grooves 25 of the feeders or transfer-members come into proper position, a stay or picket-section will drop into the notches or grooves of the opposite feeders or transfer members, the moving away of said feeders will cause the plunger 28 to be raised by the raising of the stay or picket sections, which will permit the succeeding stay or picket-sections in the hopper, receptacle or stay-containing magazine to move adjacent to the peripheral edge of the feeders, and a spring 30 will force the plunger to its normal position (see Fig. 13). During the rotation of the feeders or transfer members, the stays or pickets carried thereby are held in place by the plates or guards 26. During the rotation of the feeders the coilers are so timed in their movement that their coiling pins 12 will not engage the ends of the stay or picket sections until they are placed adjacent to the strand or line wires extending through the coilers, when the ends of the stay or picket sections are inclined downwardly (see Fig. 12), then it is that the coiling pins will engage the stay or picket sections and securely coil or wrap them around the strand or line wires with the free ends of the coils moving under, by reason of the upward movement of the strand wires; the devices for causing such movement being hereinafter described.

Referring to the shaft 9, which is a driving shaft, the same carries on one end the driving pulley 31 and the sprocket wheel 32, and the latter by a chain 33 connecting with a sprocket-wheel 34 drives a shaft 35. On the opposite end of shaft 9 is eccentrically carried a rod 36, which at its opposite end is connected to a link 37, which said link is carried by one of the shafts 22, and has the integral extension 38. To the extension 38 is attached a coupling rod 39 which at its opposite end is attached to a link 40 which is carried by the opposite shaft 22. On each of the shafts 22, which it is understood carry the disks, rotary feeders, transfer members or picket magazines 24, is carried a ratchet-wheel 41. The teeth of these ratchet wheels are engaged by spring-pressed pawls 42 carried in tubular bodies 42ª having connection with the arms or links 38 and 40. There are also carried by the shafts 22 the disks 43 having corrugated or rolling peripheries 44. Coacting with such disks are the rollers 45 carried by the extensions 19. The inner ends of the extensions 19 are bifurcated as at 46 to guide the extensions 19 in their movement. Thus it will be seen, by rotating the shaft 9 movement will be imparted to the shafts 22 through the ratchet and pawl movement, and rotate the shafts toward each other, imparting rotation to the disks, rotary feeders, transfer members or picket magazines in a step-by-step movement and through the disks 43 and rollers 45 reciprocate the bottoms 16 of the hoppers. Springs as at 46 connected with the opposite frame parts 18 serve to return the bottoms after movement by the disks 43.

Referring now to the rear of the machine, a frame support is provided by the standards 47 and 48 extending up from the base 1. To these supports are journaled the transverse shafts 49, 50, 51 and 52. On these shafts are carried pulling-out, take-up rolls or spiders 53, which also serve to crimp the strand or line wires, and are driven in the following manner: 54 denotes a ratchet wheel secured to the shaft 50, and also carried by said shaft are the arms 55 between which is pivotally secured a weighted pawl 56 adapted to engage with the teeth of the wheel 54 for causing the shaft 50 to be intermittently rotated. 57 indicates a pitman bar or rod, at one end pivotally connected at 58 to the arms 55 and its opposite end pivotally connected at 59 to a crank 60, which in turn is secured to rotate with the shaft 35. It is therefore apparent, upon the rotation of the shaft 35 and the power devices just described, the pawl 56 will be caused to intermittently and successively engage the teeth of the wheel 54 and rotate the same. This power is imparted from the shaft 50 to the shafts 49, 51, and 52 through gears 61, 62, 63 and 64 carried by the shafts 49, 50, 51 and 52, respectively. The taking-up rollers or pull-out mechanism are directly connected with a registering or tallying device for registering the number of feet or rods of fence made by the machine. A suitable tallying device indicated as 65 is operated by a chain 66 from a sprocket 67 on one end of the take-up shaft 51 (see Fig. 2). The construction of the tallying device is immaterial, but the mode of operating the same is a feature of this machine.

A frame, supporting guiding rollers, is provided for the purpose of directing the finished fabric from the coilers or winders to the pulling-out rollers, comprising suitable beams 68 supported at their rear ends on the upper ends of the frame parts 47, and at their forward ends on the frame parts or uprights 69. Two guiding rollers, referred to as 70 and 71, are provided at the forward and rear ends of the beams 68, as shown, over which the wires are directed and thence down and around the pulling-out rollers (see Fig. 2). The fabric as it leaves the roller 53 on the shaft 51 is directed to the wrapper 72 on shaft 73, which is journaled in bearings 74 on the base 1. In Figs. 1 and 3 is seen the means actuated by suitable power devices for operating the wrapper.

The pulling-out rollers 53 are so timed in their movements through the connections described with the shaft 35 as to uniformly draw an equal amount of the several strands or line wires A through the coilers or winders; and the power connections between shafts 35 and 50 may be varied, if desired, to regulate the quantity of wire pulled through the coilers or winders and thereby regulate the space between the stay-sections.

In the present invention we have obviated the necessity of providing cutting mechanism for the stay-wires, as such wires are fed to form the short-stay-sections for tying together adjacent strand-wires. Such cutting mechanism has heretofore been found necessary in machines for making a "staggered-stay" fence, and in doing away with such mechanism we simplify the working parts and provide for feeding the stay-sections very rapidly.

In the following claims we do not wish to be understood as limiting ourselves to the details of construction of the individual elements going to make up the several parts or combinations of the machine herein illustrated and described, as we regard the invention as of a character to admit of variations of these details within considerable limits without departing from its spirit and scope.

Having thus fully described our invention, what we claim and desire to secure by Letters Patent of the United States, is:—

1. In a wire fence machine, the combination of mechanism for feeding a plurality of strand-wires, mechanism for feeding sidewise short sections of stay-wires, and mechanism for coiling the ends of said stay-sections around adjacent strand-wires.

2. In a wire fence machine, the combination of mechanism for feeding a plurality of strand-wires, mechanism disposed upon opposite sides of the strand-wires for alternately feeding short sections of stay-wires, and mechanism for coiling the ends of said stay-sections around adjacent strand wires.

3. In a wire fence machine, the combination of mechanism for feeding a plurality of longitudinal strand-wires, mechanism for feeding sidewise stay-sections in lengths to span the spaces between the strand-wires, and mechanism for coiling the ends of said stay-sections around adjacent strand-wires.

4. In a wire fence machine, the combination of mechanism for feeding a plurality of longitudinal strand-wires, mechanism for simultaneously feeding sidewise stay-sections in lengths to span alternate spaces between the strand-wires, and mechanism for coiling the ends of said stay-sections around adjacent strand-wires.

5. In a wire fence machine, the combination of mechanism for feeding a plurality of longitudinal strand-wires, mechanism disposed upon opposite sides of the strand-wires for intermittently and alternately feeding stay-sections in lengths to span alternate spaces between the strand-wires, and mechanism for coiling the ends of said stay-sections around adjacent strand-wires.

6. In a wire fence machine, the combination of a plurality of coilers through which longitudinal strand-wires are fed, a plurality of hoppers from which stay-sections are fed in lengths to span the spaces between the strand-wires, and mechanism for actuating the coilers.

7. In a wire fence machine, the combination of a plurality of coilers through which longitudinal strand-wires are fed, alternate coilers rotating in opposite directions, a plurality of hoppers from which stay-sections are fed in lengths to span the spaces between the strand-wires, and mechanism for actuating the coilers.

8. In a wire fence machine, the combination of a plurality of coilers through which longitudinal strand-wires are fed, a series of hoppers upon opposite sides of the strand-wires from which are alternately fed stay-sections in lengths to span the spaces between the strand-wires, mechanism for delivering the stay-sections from the hoppers to the coilers, and means for actuating the coilers.

9. In a wire fence machine, the combination of a plurality of coilers through which longitudinal strand-wires are fed, a series of hoppers from which stay-sections are fed in lengths to span the spaces between the strand-wires, reciprocating slides supporting said stay-sections in the hoppers, and revoluble carriers for delivering said stay-sections from the slides to the coilers.

10. In a wire fence machine, the combination of a plurality of coilers arranged in line with one another, a power shaft and spiral gear connections between the coilers and said shaft, revoluble carriers rotating adjacent to said coilers, and mechanism for feeding stay-sections to the coilers.

11. In a wire fence machine, a stay-wire feeding mechanism, comprising a receptacle having a reciprocal bottom, and revoluble carriers coöperating therewith provided with notched peripheries.

12. In a wire fence machine, a stay-wire feeding mechanism, comprising a receptacle having a reciprocal bottom, and a series of intermittently revoluble carriers coöperating therewith provided with notched peripheries.

13. In a wire fence machine, a stay-wire feeding mechanism, comprising a receptacle having a reciprocal bottom, a covering plate for a portion of said bottom, revoluble carriers coöperating with said reciprocal bottoms, and a covering plate for a portion of said carriers.

14. In a wire fence machine, a stay-wire feeding mechanism, comprising a receptacle having a slidable bottom, revoluble carriers coöperating with said slidable bottom, and yielding plungers suitably supported for regulating the supply of stays to the carriers from the receptacle.

15. In a wire fence machine, a series of hoppers for supporting stay-sections, a slidable bottom for each receptacle, a frame part connecting the bottoms in a series, mechanism for actuating the frame part to reciprocate the receptacle bottoms, and a series of revoluble carriers adapted to support the stay-sections coöperating with the slidable bottoms.

16. In a wire fence machine, a stay-wire feeding mechanism, comprising a receptacle having a reciprocal stay-support, a covering plate for a portion of such support, and a channel formed between the said support and covering plate, a ridge formed on said support for forcing the stays into said channel, means for reciprocating said stay-support, and means for automatically removing the stays from the support.

17. In a wire fence machine, the combination of parallel operating shafts, a series of pairs of stay-section revoluble carriers on said shafts, stay-wire feeding mechanism comprising a series of receptacles each having reciprocal bottoms and coöperating with said revoluble carriers, means for rotating said shafts in a step-by-step movement, and means for reciprocating the receptacle bottoms.

18. In a wire fence machine, the combination of parallel operating shafts, a series of pairs of stay-section revoluble carriers on said shafts, a hopper for each pair of carriers, a reciprocal bottom for each hopper, mechanism for rotating said shafts in a step-by-step movement, mechanism carried by said shafts for imparting a reciprocal movement to the hopper bottom in one direction, and yielding devices for imparting a reverse movement to the hopper bottoms.

19. In a wire fence machine, the combination of a plurality of coilers arranged in a line with one another through which strand-wires are fed, parallel operating shafts on each side of the coilers, a series of pairs of stay-section carriers on said shafts, a hopper for each pair of carriers, a reciprocal bottom for each hopper, means for reciprocating the hopper bottoms in the same row simultaneously, and mechanism for operating the carrier shafts in a step-by-step movement, the disposition of said carriers being to deliver succeeding rows of stay-sections alternately.

20. In a wire fence machine, the combination of a plurality of coilers arranged in line with one another, alternate coilers rotating in opposite directions, a power shaft and right and left spiral gear connections between the coilers and said shaft, revoluble carriers rotating adjacent to said coilers, and mechanism for feeding stay-sections to the coilers.

21. In a wire fence machine, stay-wire feeding mechanism, comprising a receptacle having a reciprocal bottom, and a revoluble carrier coöperating therewith, substantially as specified.

22. In a wire fence machine, stay-feeding mechanism comprising an inclined reciprocal feeder, and revoluble receiving members coacting therewith, substantially as specified.

23. In a wire fence machine, stay-feeding mechanism, comprising reciprocal feeders, revoluble receiving members coacting with said feeders, power mechanism, and connections between such power, feeders, and members for simultaneously actuating the feeders and members, substantially as specified.

24. In a wire fence machine, the combination of a bed-plate, a plurality of vertically disposed coilers in the bed-plate through which strand-wires are fed, a drive shaft and connections between the drive shaft and coilers, a pair of driven shafts lying parallel upon opposite sides of the coilers, stay-feeding devices rotatably mounted on said shafts, reciprocally disposed stay-feeding devices for feeding stay-sections to the revoluble feeding devices, connections between the drive shaft and parallel shafts for rotating the latter in a step-by-step movement, and connections between the parallel shafts and reciprocally disposed feeding devices, for reciprocating the latter.

25. In a fence machine, the combination of a wire stay receptacle, a pair of vertically disposed coiling members disposed in advance of the receptacle, and means for successively delivering stays from the receptacle and depositing the opposite ends of the stays on the aforesaid coilers.

26. In a fence machine, the combination of a wire stay receptacle, a pair of vertically disposed coiling members in advance of the receptacle, a pair of revoluble feeders intermediate the coiling members and the receptacle, and means for delivering stay sections from the receptacle onto the feeders.

27. In a fence machine, the combination of coiling devices, fence stay retainers located adjacent to the coilers, a feeder forming a part of such retainers, and means for actuating said feeder and thereby delivering stays to the coilers.

28. In a wire fence machine, means for feeding a series of strand-wires, means for feeding sidewise stays to span the alternate spaces between said strand-wires, and means for connecting the ends of the stays to intersecting strand-wires.

29. In a wire fence machine, means for feeding a series of strand-wires, means for feeding sidewise stays to span the alternate spaces between said strand-wires, and means for simultaneously connecting the ends of a series of stays to intersecting strand-wires.

30. In a wire fence machine, means for feeding a series of strand-wires, means for feeding sidewise a series of short sections of stays, spaced apart, and means for connecting said stays to the said strand-wires.

31. In a wire fence machine, a plurality of simultaneously actuated coiling members, means for feeding strand-wires therethrough, and means for feeding stays sidewise to the said strands whereby their ends are coiled by said coilers about the same.

32. In a wire fence machine, a plurality of simultaneously actuated coiling members, means for feeding strand-wires therethrough, and means for feeding sidewise stays to each alternate pair of coilers to be engaged by the same for coiling the ends of said stays about the intersecting strands.

33. In a wire fence machine, a plurality of coiling members, means for feeding the strand-wires therethrough, and revoluble feeders for advancing the stays to said strands, whereby their ends are coiled by said coiling members about the same.

34. In a wire fence machine, stay wire feeding mechanism, comprising a vibratory feed for the wires, and a movable carrier coöperating with said feed.

35. In a wire fence machine, stay wire feeding mechanism, comprising a vibratory feed for the wires, and revoluble carriers coöperating with said feed suitably notched to receive such wires.

36. In weft-magazines for wire fence machines, a magazine having a bottom discharge, a shaft below the discharge, a plurality of spaced disks on said shaft and having notched peripheries for the reception of the wires, means for holding the wires in position in the notches, and a ratchet and pawl mechanism in operative connection with said shaft.

37. In weft-magazines for wire fence machines, a magazine, a vibratory discharge for the wires from the magazine, revoluble feeding disks having notched peripheries for receiving the wires from the magazine, and means for imparting a step-by-step movement to said disks.

38. In weft-magazines for wire fence machines, a magazine, a vibratory discharge for the wires from the magazine, revoluble feeding disks having notched peripheries for receiving the wires from the magazine, guards extending over a portion of the peripheries of the disks and serving to hold the wires in position in the notches, and ratchet and pawl mechanism in operative connection with said disks for imparting a step-by-step movement thereto.

39. In a wire fence machine, stay feeding mechanism comprising a vibratory hopper and rotary feeders coacting therewith.

40. In a wire fence machine, stay feeders consisting of vibratory hoppers, means for vibrating the hoppers, and rotary disks coacting therewith, substantially as specified.

41. In a wire fence machine, stay feeders consisting of a series of hoppers, rotary disks coacting with the hoppers and provided with notches in their peripheries, and means for depositing the stays on the disks from the hoppers.

42. In a wire fence machine, stay feeding mechanism comprising a vibratory hopper, means for vibrating the hopper, rotary feeders located beneath the hopper, and guides for the stays located intermediate the hopper and the rotary feeders.

43. In a wire fence machine, the combination of a series of hoppers disposed alternately to each other in opposite rows, rotary feeders coacting with the hoppers and provided with notches in their peripheries, and means for feeding stays from the hoppers to the feeders.

44. In a wire fence machine, the combination with a vibratory hopper for containing stay sections, of intermittently revoluble feeders coacting with the hopper and having notches in their peripheries for the reception of the stay sections as they are delivered by the hopper.

45. In a wire fence machine, the combination with strand wire feeding mechanism, of stay feeding mechanism comprising a series of vibratory hoppers and rotary feeders coacting therewith adapted to receive the stays and deliver them to the strand wires.

46. In a wire fence machine, the combination of a series of hoppers for containing stay sections, the said hoppers disposed alternately in opposite rows, a driving shaft extending longitudinally beneath the hoppers of each row, revoluble stay feeders carried by the said shafts and disposed beneath the hoppers, means for vibrating the hoppers and for dropping the stay sections successively upon the feeders, and means for intermittently rotating said feeders.

47. In a machine for making a wire fencing comprising a plurality of longitudinally extending strand wires and cross wires connecting them, the combination with means for supporting the strand wires, of a plurality of hoppers each adapted to contain cross wires previously cut to the required length, devices for feeding said cross wires successively from the hoppers to each pair of adjacent strand wires, and means for connecting the ends of said cross wires to adjacent strand wires.

48. In a machine for making a wire fencing comprising three or more longitudinally extending strand wires and a plurality of cross wires each connecting two of said strand wires into pairs, a plurality of hoppers each adapted to contain cross wires previously cut to the required length, devices for feeding said cross wires successively from the hoppers to each pair of strand wires, and means for uniting said cross wires to the strands.

49. In a machine for making wire fencing, the combination with means for suitably supporting the strand wires, and winders adapted to receive the strand wires and apply cross-wires thereto, of means for engaging the strand wires and guiding them into coöperative relation with their corresponding winders, and means for supplying cross wires to the winders behind the strand wires.

50. In a wire feeding device, the combination with a movable transfer member, of a wire feed plate controlled by the movements of the transfer member for supplying wires to the latter.

51. In a wire feeding device, the combination with a movable transfer member, of a wire feed plate arranged to be operated by said member for controlling the supply of wires to the latter.

52. In a machine for making wire fencing, the combination with the bed having suitable means for supporting the strand wires in operative position, of cross-wire winders arranged in a plurality of rows extending transversely to the strand wires, the winders of each row being grouped in pairs for receiving cross-wires from a suitable source of supply, and means for operating the several pairs of winders to simultaneously apply the cross-wires between the alternate spaces of the strand-wires.

53. In a machine for manufacturing wire fencing, the combination with a bed having suitable means for supporting the strand-wires, of cross-wire winders arranged in a plurality of rows extending transversely of the strands, the winders of each row being grouped in pairs, a cross-wire supply for each pair of winders in each row, said winders being arranged to simultaneously connect the opposite ends of each cross-wire on the strand wires so as to span the alternate spaces between the strand wires.

54. In a wire fence machine, the combination of mechanism for intermittently advancing a plurality of strand wires, a plurality of hoppers, each hopper adapted to contain previously-formed stay sections, means for feeding stay sections one at a time from each hopper, and means for receiving the single stay section fed from each hopper and delivering the same to the strand wires, substantially as described.

55. In a wire fence machine, the combination with means for supporting and feeding a plurality of running-wires therethrough, of a picket-wire magazine consisting of a rotating drum having formed in its periphery a plurality of picket-wire-receiving grooves, means for introducing picket-wires into said grooves, and means for advancing said magazine step-by-step, whereby the picket-wires may be successively advanced from receiving position.

56. In a wire fence machine, the combination of mechanism for feeding a plurality of longitudinal strand-wires, mechanism for simultaneously feeding sidewise a plurality of axially alined stay-sections, each of which is adapted to connect two spaced strand-wires, and mechanism for coiling the ends of said stay-sections around said strand-wires.

57. In a wire fence machine, the combination of mechanism for feeding a plurality of longitudinal strand-wires, mechanism for simultaneously feeding sidewise a plurality of stay-sections, alternate sections of which are in axial alinement and each section being adapted to connect two spaced strand-wires, and mechanism for coiling the ends of said stay-sections around said strand-wires.

58. In a wire fence machine, the combination of a plurality of vertically disposed coiling members through which strand-wires are fed, transfer mechanism for moving sidewise a plurality of short-sections of stay-wires and to deliver the same onto said coiling members, means disposed in a plane above the coiling members over which the completed fence is fed, and a reel to take up the completed fence.

59. In a wire fence machine, the combination of a plurality of vertically disposed coiling members through which strand-wires are fed, transfer mechanism for moving sidewise a plurality of short stay-wires forming the sections of transverse stays, and to deliver the same onto said coiling members, means for feeding said stay-wires to the transfer mechanism, means disposed above the coiling members over which the completed fence is fed, and a reel to take up the completed fence.

60. In a wire fence machine, the combination of a plurality of coilers arranged in line with one another through which strand-wires are fed, gear wheels on the lower ends of each coiler, a driving shaft common to all coilers and having a plurality of gear wheels in mesh with the gear wheels on the coilers, and mechanism for feeding sidewise short-sections of stays to adjacent coilers.

61. In a wire fence machine, means for feeding a series of strand-wires, means for feeding sidewise stay lengths to span the spaces between adjacent strand-wires, and means for simultaneously connecting the ends of said stay lengths to adjacent strand-wires.

62. In a wire fence machine, the combination of a plurality of vertically disposed coiling members through which strand-wires are fed, transfer mechanism for moving sidewise stay-sections and to deliver the same onto said coiling members, and mechanism for feeding said stay-sections to said transfer mechanism.

63. In a wire fence machine, in combination, a plurality of wire-connecting mechanisms, means for intermittently feeding a plurality of strand wires, transfer mechanism for feeding sidewise straight stay wires to position to be connected to said strand wires, and means for feeding said straight stay wires to said transfer mechanism.

64. In a wire fence machine, in combination, wire-connecting mechanisms, means for intermittently feeding strand wires, transfer mechanism for moving sidewise a straight stay length and locating the same in position to be connected to said strand wires, and means for feeding said straight stay length to said transfer mechanism.

65. In a wire fence machine, in combination, wire-connecting means, gear mechanisms operatively connected with said wire-connecting means, a driving shaft operatively connected with said gear mechanisms, means for intermittently feeding strand wires, transfer mechanism for moving sidewise a straight stay length and locating the same in position to be connected to said strand wires, and means for feeding said straight stay length to said transfer mechanism.

66. In a wire fence machine, in combination, a plurality of stay-wire coiling members, a gear wheel connected with each coiling member, means for intermittently feeding strand wires through said coiling members, an operating shaft disposed transversely to said coiling members and carrying a plurality of gear wheels in operative connection with the gear wheels of said coiling members, transfer mechanism for moving sidewise a straight stay length and locating the same in position to be connected to said strand wires, and means for feeding said straight stay length to said transfer mechanism.

In testimony whereof we affix our signatures, in presence of two witnesses.

PETER W. SOMMER.
JOSEPH W. SOMMER.
WILLIAM SOMMER.

Witnesses:
CHAS. F. BAILEY,
L. WILSON.